Patented Jan. 2, 1934

1,941,900

UNITED STATES PATENT OFFICE 1,941,900

TESTICULAR EXTRACT AND METHOD OF MAKING THE SAME

Fred C. Koch, Lemuel C. McGee, and Thomas F. Gallagher, Chicago, Ill., assignors to University of Chicago, a corporation of Illinois No Drawing. Application May 3, 1929
Serial No. 360,306

7 Claims. (Cl. 167—74)

This invention relates to improvements in testicular extracts, and method of making the same.

One of the objects of our invention is to obtain from the testicles or testicular glands or tissues of animals, for example bulls, a potent or physiologically active, constituent, substance, or extract, containing in concentrated form the secretion or hormone of the gland, sufficiently free from injurious substances for repeated administration to human patients or laboratory animals.

This testicular extract, the result of our invention, to be administered by feeding or injection, is prepared for the purpose of assisting the natural reactions and functions of the body, stimulating the natural activities and otherwise producing beneficial effects in the treatment and prevention of disease.

In the practice of our invention, we take a quantity of testicles obtained from slaughtered animals, for example, bulls, remove the tunics, grind, and place in two or three volumes of a suitable liquid for the purpose of coagulating the proteins. We have found that 95% ethyl alcohol accomplishes this very well. The tissue is allowed to remain in the liquid, with frequent stirring, from forty-eight to seventy-two hours; the liquid is then removed by filtration, and the residue discarded.

The liquid filtered out is preferably concentrated to a smaller volume by distilling under reduced pressure to produce an aqueous sludge. Water is then removed from this sludge in any suitable manner, as, for example, by the addition of absolute alcohol and evaporation, until a thick, milky, aqueous-lipoid sludge is produced.

The sludge just referred to, while still warm, is then mixed with one-half to an equal volume of an immiscible fat solvent, such as benzene, agitated, allowed to cool, and the mixture permitted to settle. The supernatant benzene solution with the dissolved solute is then poured off. The extraction of more material from the sludge by solution in benzene, may be accomplished, if desired.

The benzene extracts thus produced are then combined and preferably concentrated to a smaller volume by distilling under reduced pressure. The benzene is then substantially completely removed in any suitable manner, as by the addition of small amounts of absolute alcohol and evaporation under reduced pressure.

After the complete removal of the benzene the residue or solute is fractionated with successive fat solvents. For example, it is dissolved in acetone and set aside at 10° to 20° F. for some hours. The liquid portion is then separated from the separated lipoid material. Most of the acetone is distilled off from the filtrate under reduced pressure and the concentrated material next treated with 50% alcohol to extract the soluble portion. The 50% alcohol solution is next distilled under reduced pressure to remove all of the alcohol. The pasty solid material left is again treated with 50% alcohol and set aside for some hours at 10° to 20° F. Again the insoluble material is separated from the 50% alcoholic solution. The 50% alcoholic solution is distilled under diminished pressure to remove the alcohol and water. The pasty solid material remaining is dissolved in a small amount of absolute alcohol and diluted to a desired concentration with such vehicles as glycerol, olive oil, or water. This material is now suitable for injection or for administration by mouth.

The testicular extract, the result of our invention, has been tested by injection into castrated laboratory animals and has been found to have a marked effect upon the secondary sex characteristics of such animals. For example, the substance has been tested upon the capon, the rat and guinea pig. Laboratory tests have shown that we have obtained a truly active extract from bull's testicles. Such tests, involving injection of the substance produced in the practice of our invention, have caused a marked growth of the comb, wattles and ear lobes of capons. Use of the substance has also corrected certain castration effects in the rat and in the guinea pig. It has been known that in the case of a completely castrated guinea pig with the epididymides left intact, the spermatozoa never retained their motility beyond twenty-three to twenty-five days following castration. By injecting the extract of our invention in such castrated guinea pigs, we have been able to prolong the time of motility of spermatozoa well over thirty days and up to fifty-four days. By injection of the extract of our invention in castrated guinea pigs, we have also been able to correct the loss of the secretory function of both the seminal vesicles and the prostate, as demonstrated by the electric ejaculation test. The tests made upon laboratory animals have demonstrated that by the use of our invention, it is possible to produce a potent extract of the character referred to in concentrated form and sufficiently free from impurities for repeated administation to human patients.

Although the present invention has been described in connection with the details of a specific embodiment thereof, it is not intended that such details shall be regarded as limitations upon the scope of the invention, except in so far as included in the accompanying claims.

What we regard as new, and desire to secure by Letters Patent, is:

1. The method of concentrating and purifying a testicular hormone which comprises removing the protein constituents from the testicular tissue, and extracting the testicular hormone from the residue at least once with a fat solvent, and removing the fat solvent.

2. The method as set forth in claim 1, in which the fat solvent is an immiscible liquid.

3. The method as set forth in claim 1, in which the fat solvent is benzene.

4. The method as set forth in claim 1, in which the concentrated testicular hormone is fractionated with an additional fat solvent.

5. The method as set forth in claim 1, in which the concentrated testicular hormone is successively fractionated with acetone and alcohol.

6. The method of obtaining a potent extract from a testicular tissue constituent in concentrated form and sufficiently free from impurities for repeated administration to animals which comprises, treating a testicular tissue constituent with substantially pure ethyl alcohol to coagulate the proteins and render them insoluble, removing the liquid therefrom, concentrating said liquid to an aqueous lipoid sludge, treating said sludge at least once with benzene, recovering the solute dissolved by the benzene and successively fractionating said solute with acetone and alcohol.

7. A potent extract from a tissue constituent, containing the testicular hormone, said extract being of a concentration of the order of that obtained by treating testicular tissue with substantially pure ethyl alcohol to coagulate the proteins and render them insoluble, removing the liquid therefrom, concentrating said liquid to an aqueous lipoid sludge, treating said sludge at least once with benzene, recovering the solute dissolved by the benzene and successively fractionating said solute with acetone and alcohol, said extract being sufficiently free from impurities for repeated administrtaion to animals, and having the physiological properties of producing marked effect upon the secondary sex characteristics of castrated laboratory animals.

FRED C. KOCH.
LEMUEL C. McGEE.
THOMAS F. GALLAGHER.